United States Patent [19]

Glenister

[11] 4,285,975

[45] Aug. 25, 1981

[54] PRODUCTION OF BREWER'S WORT

[75] Inventor: Paul R. Glenister, Chicago, Ill.

[73] Assignee: Miles Laboratories, Inc., Elkhart, Ind.

[21] Appl. No.: 116,574

[22] Filed: Jan. 29, 1980

[51] Int. Cl.³ ............................. C12C 7/00; C12C 9/00
[52] U.S. Cl. ........................................ 426/29; 426/16; 435/93
[58] Field of Search ................... 426/16, 29; 435/93, 435/99

[56] References Cited

U.S. PATENT DOCUMENTS

| | | | |
|---|---|---|---|
| 2,790,718 | 4/1957 | Nugey | 426/29 |
| 2,951,762 | 9/1960 | Nugey | 426/29 |
| 3,353,960 | 11/1967 | Bavisotto | 426/29 |
| 3,713,840 | 1/1973 | Quittenton | 426/29 |
| 3,912,590 | 10/1975 | Slott et al. | 435/99 |
| 4,092,434 | 5/1978 | Yoshizumi et al. | 426/29 X |

*Primary Examiner*—David M. Naff
*Attorney, Agent, or Firm*—Louis E. Davidson

[57] ABSTRACT

Brewer's wort is prepared by a process comprising the steps of forming at 82° to 88° C. an aqueous mash containing malted cereal, unmalted cereal and an effective amount of a starch liquefying thermostable alpha amylase; maintaining the mash at such temperature until a substantial amount of the cereal starch has been liquefied; cooling the mash to a temperature of 60 to 65° C.; adding an effective amount of starch saccharifying diastatic enzyme to the mash; maintaining the resulting mixture at 60 to 65° C. until a substantial amount of the cereal starch has been saccharified; then raising the temperature of the mash to at least 72° C. and maintaining the mash at this temperature until the starch has been completely converted.

2 Claims, No Drawings

PRODUCTION OF BREWER'S WORT

BACKGROUND AND PRIOR ART

Traditionally, brewer's wort, which is eventually fermented with yeast to produce beer beverages, was prepared by mashing a malted cereal, such as malted barley. This mashing process consisted primarily of heating an aqueous mixture of malted cereal until the enzyme activity of the malted cereal liquefied and saccharified the starch of the cereal to form fermentable sugars. Generally, the mashing temperature never exceeded 80° C. since the enzyme activity of the malt is destroyed at temperatures above about 80° C. The starch digesting enzymes contained in malted cereal are most active at temperatures of about 60°–72° C.

As the brewing art has progressed, there has been a desire to replace a significant amount of the malted cereal with unmalted cereals, such as corn, rice or barley. The prior art processes generally employed two processing stages. In the first cooker stage, the unmalted cereals are liquefied by treatment with appropriate enzymes at relatively low temperatures followed by heating to about 100° C. in order to complete the starch degradation. The resulting liquefied starch is then mixed with malted cereals for subsequent enzymatic saccharification during the mashing stage. U.S. Pat. No. 2,790,718 is typical of such prior art. Other references of processes for preparing brewer's wort employing unmalted cereals and enzymes other than malted barley are U.S. Pat. Nos. 2,951,762; 3,081,172; 3,295,987; 3,353,960 and Canadian Pat. No. 945,920. Use of thermostable enzymes for the production of wort or liquefied starch is disclosed in U.S. Pat. Nos. 3,551,293 and 3,912,590 and British Pat. No. 1,345,413. All of these prior art processes either do not provide a commercially acceptable end product or they involve an undesirable step of heating the starch or mash to boiling. This can lead to undesirable flavors in the final product.

There is a need in the art for a process to produce brewer's wort which uses elevated temperatures for rapid and complete liquefaction of the cereals but does not require temperatures as high as 100° C. and which does not require separate cooker and mashing equipment and procedures.

SUMMARY OF THE INVENTION

In accordance with the present invention, a process is provided for preparing brewer's wort which comprises:

(a) forming at 82° to 88° C. an aqueous mash containing from 23 to 40 weight percent malted cereal and from 60 to 77 weight percent unmalted cereal, said weight percents based on the total weight of such malted and unmalted cereals, and also containing an effective amount of starch liquefying thermostable alpha amylase;

(b) maintaining the mash at such temperature until a substantial amount of the cereal starch has been liquefied;

(c) cooling the mash to a temperature of 60° to 65° C.;

(d) adding an effective amount of starch saccharifying diastatic enzyme to the mash and maintaining the resulting mixture at 60° to 65° C. until a substantial amount of the cereal starch has been saccharified;

(e) raising the temperature of the mash to at least 72° C. and maintaining the mash at this temperature until the starch has been completely converted.

DESCRIPTION OF THE INVENTION

The malted cereal, such as malted barley, used as a raw material in this process is the commercially available malt presently used in the brewing industry. The unmalted cereals, such as corn grits, rice, rice flour, corn meal, refined corn starch and the like, are also well known and are commercially available.

The starch liquefying thermostable alpha amylase used in the present invention is any alpha amylase that retains its activity and is useful at temperatures in the range of 82° to 88° C. Preferably this enzyme is obtained from *Bacillus licheniformis*. Such enzyme is commercially available from Miles Laboratories, Inc. under the trademark KINASE HT.

In the first step of the process of the present invention an aqueous mash is produced by adding a mixture of from 23 to 40 weight percent malted cereal and from 60 to 77 weight percent unmalted cereal, said weight percents based on the total weight of such malted and unmalted cereals, to water at 82° to 88° C. If the temperature is below about 82° C., the reaction will proceed too slowly and cause the mashing schedule to be unduly prolonged. There is no technical advantage to employing a temperature in excess of 88° C. Preferably this step is carried out at 85° C. The resulting aqueous mixture should also contain an effective amount of the starch liquefying thermostable alpha amylase. An "effective amount" is the amount of enzyme that will accomplish the desired starch liquefaction in a reasonable time period, such as about 30 minutes. A typical amount of enzyme that is effective is 0.1 weight percent, based on weight of the unmalted cereal, of KINASE HT brand alpha amylase having an activity of 170,000 Modified Wohlgemuth Units (MWU) per gram. A Modified Wohlgemuth Unit is the amount of enzyme which will dextrinize 100 mg. of soluble starch to a definite size dextrin in thirty minutes under the conditions of the assay. The assay is carried out under the following conditions:

AMYLASE ASSAY

A 5 ml. portion of 4 percent (weight/volume basis) aqueous starch solution buffered at pH 5.4 by disodium monohydrogen phosphate-monosodium dihydrogen phosphate buffer was added to a test tube. A 4 ml. portion of distilled water was added to the test tube and the resulting mixture was equilibrated at 40° C. for 10 minutes. To this mixture was then rapidly added a 1 ml. portion of enzyme solution. The concentration of the enzyme solution was selected so as to obtain an endpoint in 5 to 25 minutes. The resulting mixture was then maintained at 40° C. At noted times after 5 minutes, a 1 ml. sample was removed from the test tube and mixed with 5 ml. of a dilute iodine solution. This iodine solution was previously prepared by first preparing a stock iodine solution by dissolving 11 g. potassium iodide in 150 ml. distilled water and then adding 5.5 g. iodine crystals. The resulting solution was then diluted to 250 ml. A 2 ml. portion of this stock iodine solution was then added to a solution of 20 g. potassium iodide in 400 ml. water. The resulting solution mixture was then diluted to 500 ml. to produce the desired dilute iodine solution. The color resulting from the complex of the enzyme-starch reaction product and the iodine solution was compared to the color of a standard Alpha-Amylase Color Disk marketed by Hellige, Inc. under Catalog No. 620-S5. As the color of the successive samples of the reaction mixture-iodine complex approaches that of the color disk, samples of the reaction mixture are taken at 15 second intervals. The endpoint is that time in the digestion when the sample gives a color matching that of the standard disk. The assay activity is then calculated as follows:

$$MWU/g = 3000/WT$$

wherein

W = g of enzyme added in the 1 ml. aliquot.
T = time in minutes required to reach endpoint.

The enzyme-aqueous mash mixture is maintained at 82° to 88° C. for a sufficient time to liquefy a substantial portion of the cereal starch in the mash. This is indicated by the achievement of desired gelatinization and reduction in viscosity. A period of about 30 minutes is satisfactory for this step of the process.

The aqueous liquefied mash is then cooled to a temperature of 60° to 65° C. by any convenient technique known in the brewer's art. An effective amount of starch saccharifying diastatic enzyme, such as barley malt, is then added and the resulting mixture is maintained at 60° to 65° C. until a substantial amount of the cereal starch from the liquefying step has been saccharified. Other saccharifying enzymes, such as microbial amylase or amyloglucosidase, could be used in conjunction with or in place of barley malt. The progress of the saccharification may be followed conveniently by removing drop-size samples of the mash from time to time and examining them microscopically with a stain, such as IKI-NaCl. As the saccharification proceeds, the particles of free amylose and amylopectin are digested. If barley malt is used as the saccharifying enzyme, only grains of malt starch are present at the end of the saccharification step. A period of about 30 minutes is satisfactory for this step of the process. An "effective amount" of barley malt has been found to be about 10 to 25 weight percent of the total barley malt added initially and at this step of the process. It is desired that the total unmalted and malted cereal added initially and at this step of the process consist of 55 to 70 weight percent unmalted cereal and 30 to 45 weight percent malted cereal, said weight percents based on the initial total weight of such added cereals.

The saccharified mash is then heated to at least 72° C. and preferably to 76° C. and maintained at this temperature until the starch of the malted cereal added at the saccharification step has been completely converted as indicated by no blue color formation in the iodine spot-plate test. A period of about 30 minutes is satisfactory for this step of the process.

The wort is then separated by well-known procedures, such as filtration, from the spent grains and can be fermented to form the desired beer beverage.

The invention is described in further detail in the following examples.

EXAMPLE 1

A 1200 ml. portion of tap water containing 500 ppm. of calcium sulfate dihydrate was heated to 85° C. To the hot water were then added with continuous stirring in order 0.223 g. of thermostable alpha-amylase obtained from *Bacillus licheniformis* (KINASE HT brand), 223 g. common yellow corn grits and 124.5 g. ground barley malt. This aqueous mash contained 35.8 weight percent malted cereal and 64.2 weight percent unmalted cereal based on the total weight of the added cereal. The mash was maintained at 85° C. with stirring for 30 minutes. The mash was then allowed to cool to 65° C., whereupon 41.5 ground barley malt was added. The total cereal added to form the mash was thus 57.3 weight percent unmalted cereal and 42.7 weight percent malted cereal based on the initial total weight of such added cereals. The resulting mash was maintained at 65° C. with stirring for 30 minutes. The mash was then heated to 76° C. and maintained at this temperature until an iodine spot-plate test indicated the absence of free unconverted starch. This required about 30 minutes. A 1400 ml. portion of sparge water was added and the wort was separated from the spent grains by filtration. A total of 1625 ml. of wort was collected which contained 181 g. of wort extract.

EXAMPLE 2

The procedure of Example 1 was repeated except that no thermostable *Bacillus licheniformis* alpha-amylase was added. A total of 1502 ml. of wort was collected containing 167.45 g. of wort extract. This is 7.6 volume percent less wort and 7.5 weight percent less wort extract than that obtained in Example 1. These significantly reduced values show the necessity of employing the thermostable alpha-amylase in the process of the present invention.

EXAMPLE 3

A wort was prepared according to the procedure of Example 1. It was then mixed with hops in an amount about three-fourths of the usual hopping rate employed in pilot scale brewing. The wort was then fermented for 5 days at 60° F. (15.56° C.) and then 3 days at 32° F. (0° C.) After decanting the resulting beer from the settled yeast, the beer was held in ruh storage at 0° C. for 7 days, filtered, treated with antioxidant and chillproofed for 2 days, final filtered, held under 16 psi carbon dioxide pressure at 0° C. for 2 days, bottled and pasteurized. The resulting finished beer had desirable overall characteristics with acceptable drinkability as a beverage. This example demonstrates the utility of the process of the present invention to produce a wort capable of producing a suitable beverage.

EXAMPLE 4

A 1200 ml. portion of tap water containing 500 ppm. of calcium sulfate dihydrate was heated to 85° C. To the hot water were then added with continuous stirring 0.223 g. of thermostable alpha-amylase obtained from *Bacillus licheniformis* (KINASE HT brand), 223 g. common yellow corn grits, 48.8 g. barley and 83 g. ground barley malt. This aqueous mash contained 23.5 weight percent malted cereal and 76.5 weight percent unmalted cereal based on the total weight of the added cereal. The mash was maintained at 85° C. with stirring for 30 minutes. The mash was then allowed to cool to 65° C., whereupon 41.5 g. ground barley malt was added. The total cereal added to form the mash was thus 68.5 weight percent unmalted cereal and 31.5 weight percent malted cereal based on the initial total weight of such added cereals. The resulting mash was maintained at 65° C. with stirring for 30 minutes. The mash was then heated to 76° C. and maintained at this temperature for 30 minutes until an iodine spot-plate test indicated the absence of unconverted starch. A 1400 ml. portion of sparge water was added and the wort was separated from the spent grains by filtration. This wort was analyzed to contain 295.8 g. of wort extract which is 96% of the total extract calculated to be available in the cereals employed for mashing. This indicates the effectiveness of the wort production process.

What is claimed is:

1. A process for preparing brewer's wort which consists essentially of:
   (a) forming at 82° to 88° C. an aqueous mash containing from 23 to 40 weight percent malted cereal and from 60 to 77 weight percent unmalted cereal, said weight percents based on the total weight of such malted and unmalted cereals, and also containing an amount of starch liquefying thermostable alpha amylase produced by *Bacillus licheniformis* effective to substantially liquify the starch;
   (b) maintaining the mash at such temperature until a substantial amount of the cereal starch has been liquefied;
   (c) cooling the mash to a temperature of 60° to 65° C.;
   (d) adding malted cereal to the mash wherein the total unmalted and malted cereals added in steps (a) and (d) consist of 55 to 70 weight percent unmalted cereal and 30 to 45 weight percent malted cereal, said weight percents based on the initial total weight of such added cereals, and maintaining the resulting mixture at 60° to 65° C. until a substantial amount of the cereal starch has been saccharified;
   (e) raising the temperature of the mash to a value from 72 to 76° C. and maintaining the mash at this temperature until the starch has been completely converted, and
   (f) separating brewer's wort from the mash obtained from step (e).

2. A process according to claim 1 wherein step (a) is conducted at 85° C., step (b) is maintained for about 30 minutes, step (c) is conducted at 65° C., step (d) is maintained for about 30 minutes, and step (e) is maintained at 76° C. for about 30 minutes.

* * * * *